United States Patent [19]

Sawada et al.

[11] 3,911,111

[45] Oct. 7, 1975

[54] ENZYME INHIBITOR SPECIFIC AGAINST THIOL PROTEASE AND PROCESS FOR PRODUCTION THEREOF

[75] Inventors: Jiro Sawada, Kodaira; Tetsuo Misaki, Higashimurayama; Kazunori Hanada, Urawa; Masaharu Tamai, Tokorozawa; Michio Yamagishi, Tokorazawa; Hikoji Tsuji, Tokorazawa; Kyoko Komiya, Urawa; Takako Nakajima; Junichi Machida, both of Tokyo, all of Japan

[73] Assignee: Taisho Pharmaceutical Co. Ltd., Tokyo, Japan

[22] Filed: Feb. 28, 1974

[21] Appl. No.: 447,038

[30] Foreign Application Priority Data
Mar. 6, 1973  Japan.................................. 48-26389

[52] U.S. Cl..................................... 424/118; 195/81
[51] Int. Cl.²...................... C12D 13/06; C07G 7/00; A61K 35/00
[58] Field of Search ................. 195/65, 81; 424/118

[56] References Cited
UNITED STATES PATENTS
3,819,486    6/1974    Murao et al. ..................... 195/80 R Primary Examiner—Lionel M. Shapiro
Attorney, Agent, or Firm—Wenderoth, Lind & Ponack

[57] ABSTRACT

A new specific enzyme inhibitor, E–64, possessing a specific inhibitive activity against only thiol proteases together with extremely low toxicity is obtained by culturing an E–64 producing microorganism of the *Aspergillus japonicus* group in a nutrient medium therefor.

3 Claims, 2 Drawing Figures

ENZYME INHIBITOR SPECIFIC AGAINST THIOL PROTEASE AND PROCESS FOR PRODUCTION THEREOF

BACKGROUND OF THE INVENTION

Many high molecular weight proteolytic enzyme inhibitors of natural origin are well known previously. On the other hand, as far as low molecular weight proteolytic enzyme inhibitors derived from microorganisms are concerned, there are only a few mentioned in the literature, for example, leupeptin — Japanese Patent Publication No. Sho 45-17154, J. of Antibiotics 22 (6) 283-286, 1969, ibid. 22 (11) 556-568, 1969, ibid. 24 (6) 402-404, 1971;

antipain — Japanese Patent Laying Open No. Sho 48-40993, J. of Antibiotics 25 (4) 263-266, 1972, ibid. 25 (4) 267-270, 1972; and chymostatin — J. of Antibiotics 23 (8) 425-427, 1970.

All of these substances reported are peptide-like substances containing algininal as one of their constituents which is considered as an active site, and exhibit rather broad inhibitive spectra against serine proteases such as trypsin in addition to thiol proteases.

As synthetic thio-protease inhibitors, monoiodoacetic acid and p-chloromercurybenzoic acid are previously known, however, they are always accompanied with high toxicity, therefore, they are, of course, far from suitable in medical application.

Thus, enzyme inhibitors of natural origin possessing broad inhibitive spectra or synthetic ones accompanied with high toxicity have already been reported, however, there is no report as to a low molecular weight enzyme inhibitor produced by a microorganism and possessing a specific inhibitive activity against only thiol proteases together with low toxicity.

The product of this invention, E-64, possessing a specific inhibitive activity against only thio-proteases together with extremely low toxicity, was discovered in the systematic screening of substances which are produced by various fungi and which possess an inhibitive activity against caseinolysis by papain.

The product of the present invention, E-64, is clearly distinguished from the previously reported substances not only in inhibitive activity but also in structural characteristic, that is, E-64 has an epoxide group but no aldehyde as its active site.

BRIEF SUMMARY OF THE INVENTION

This invention relates to a new specific enzyme inhibitor and to processes for its production and for purification thereof.

More particularly, this invention is concerned with a new specific enzyme inhibitor designated "E-64", derived from a new strain of microorganism belonging to *Aspergillus japonicus* as a novel and useful product, with a process for the preparation of the said novel specific enzyme inhibitor and moreover with a process for the purification thereof.

The object of the present invention is to obtain the product possessing the inhibitive activity of thiol-proteases.

It is still another object of the invention to obtain easily the new specific enzyme inhibitor designated "E-64" possessing a strong inhibitive activity against only thiol-proteases coupled with extremely low toxicity.

The above-mentioned new specific enzyme inhibitor, E-64, can be produced by cultivation of a new microorganism strain belonging to *Aspergillus japonicus*, and is obtainable as a pure crystal according to the process of this invention.

E-64 is a strong thiol-inhibitor coupled with extremely low toxicity and inhibits effectively and specifically thiol-proteases such as papain, bromelain and some kinds of cathepsin in which some sulfhydryl group plays a role of activity development.

Accordingly, E-64 is useful as an anti-inflammatory agent which inhibits thiol-protease appearing in Althus' inflammation and cathepsin released into a tissue in case of some inflammation and in addition, as a specific chemical reagent.

Said microorganism strain belonging to *Aspergillus japonicus* and producing large amounts E-64 was isolated from a soil sample collected at Mt. Tanzawa in Kanagawa prefecture, Japan, and designated as TPR-64 (ATCC No. 20397) by the Applicants.

DETAILED DESCRIPTION OF THE INVENTION

Figure 1:
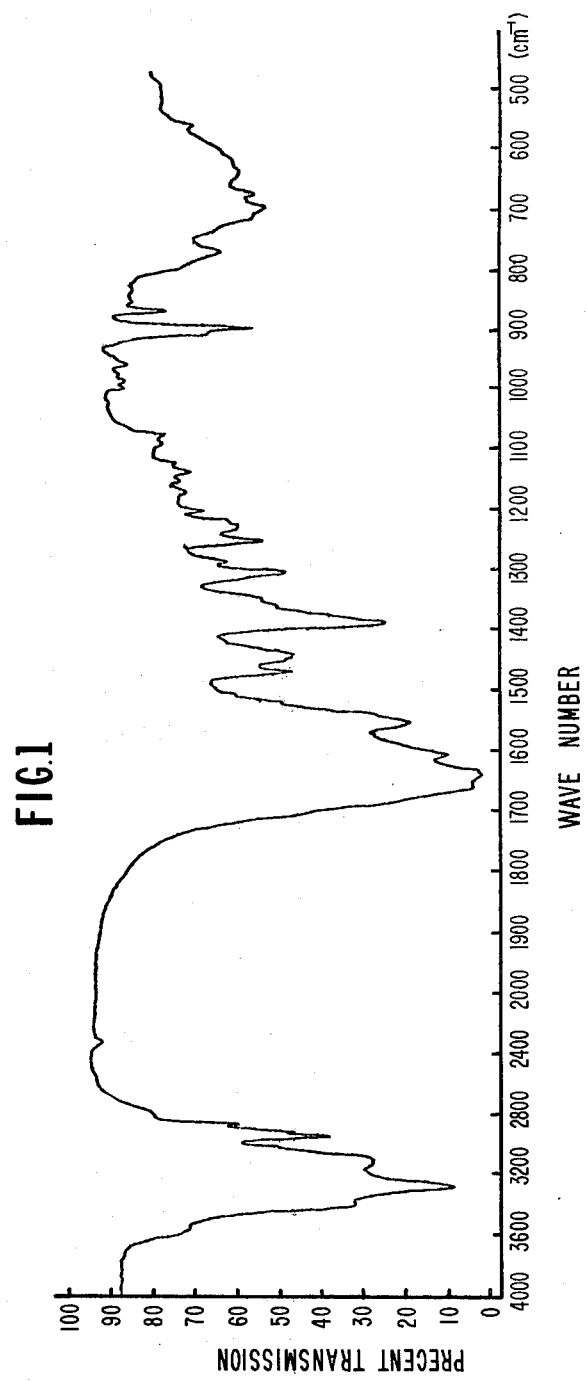
FIG. 1 shows the infrared absorption spectrum of E-64 determined with tables of KBr.
Figure 2:
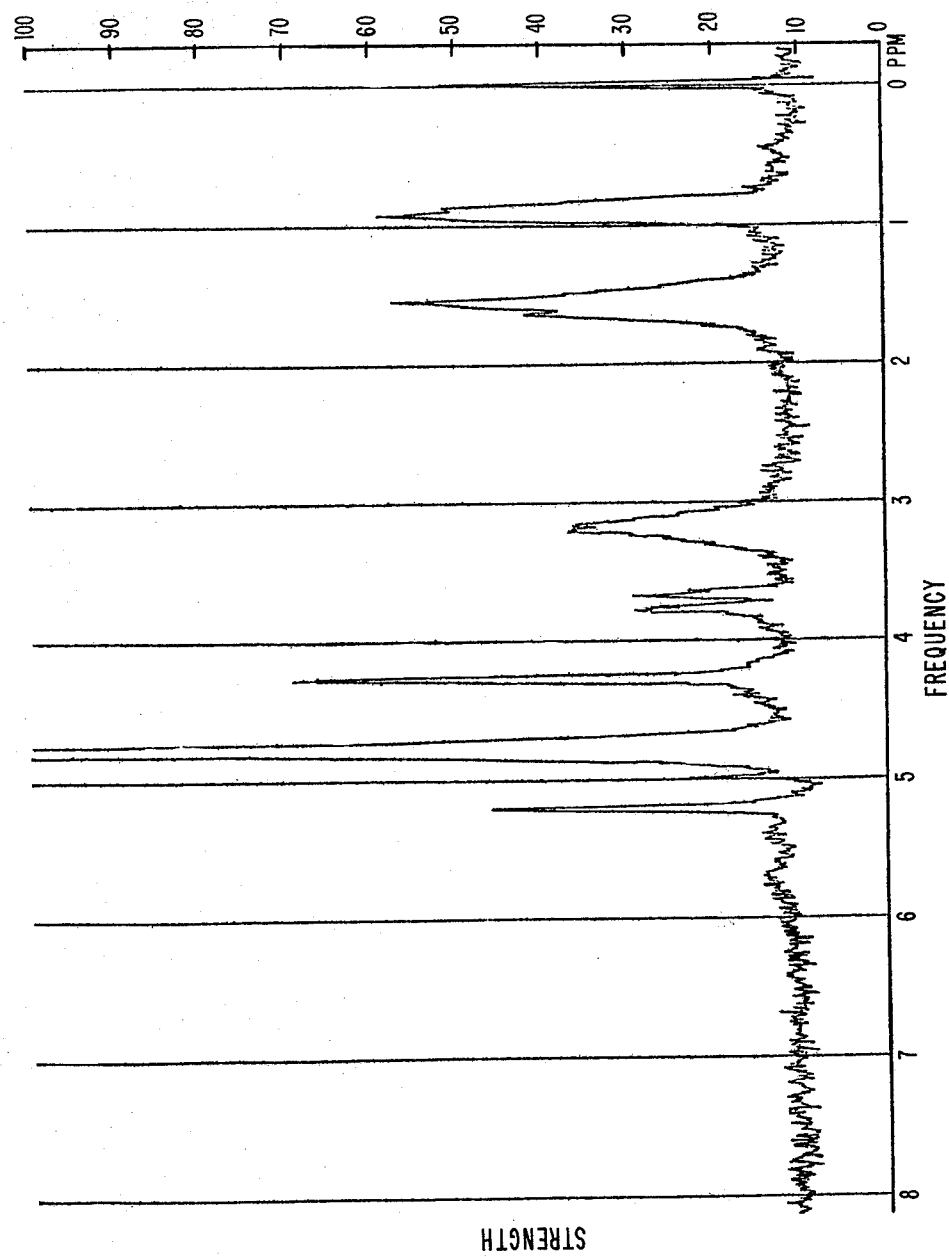
FIG. 2 shows the nuclear magnetic resonance spectrum at 60 MHz of E-64 in $D_2O$ containing 1 gutta of DCl.

The microgiolobical properties of the new strain, *Aspergillus japonicus* TPR-64 (ATCC 20397) are as follows:

General morphological observation was carried out upon the new strain cultivated on Czapek-agar culture medium at 30°C. for 3 to 4 days.

Perithecium : not produced.

Ascus : not produced.

Mycellia : smooth, with septa.

Condiophore : smooth, without septa, stretched vertically from foot cell, 500 to 1200 $\mu$ in length by 5.9 to 8.3 $\mu$ in width, but varying greatly in these dimensions.

Vesicle : usually globose or nearly so, 13 to 43 $\mu$ in diameter.

Strigmata : 6.5 to 8.0 by 3.5 to 5.5 $\mu$ in a single series.

Conidia : globose, distinct echinulate, 4.5 to 5 $\mu$ in diameter.

Colonies : yellowish-brown on potato-dextrose-agar medium.

This strain is able to utilize moderately or well glucose, xylose, mannose, galactose, fructose, lactose, maltose, saccharose, trehalose, laffinose, melibiose, dextrin and starch as carbon sources, but not at all arabinose, inulin, cellulose and ethanol.

On the other hand, this strain shows the maximal growth at around 30°C. and is unable to grow below 10°C. and over 40°C. The strain can assimilate nitrate also.

From the above-mentioned morphological and biochemical charcteristics, the present strain may be classified to the species of *Aspergillus aculeatus* or *Aspergillus japonicus*.

These characteristics of the strain were also compared with those of the standard strains, *Aspergillus japonicus* Saito IFO-4060, IFO-4062 and *Aspergillus*

*aculeatus* IAM 2445 cultured simultaneously on the media of Czapek-agar, malt-extract-agar and potato-dextrose-agar. From these results, this strain was found much similar to both standard strains of *Aspergillus japonicus* and so was designated as *Aspergillus japonicus* TPR–64.

This strain has been deposited to the Institute for Microbiological Industry and Technology, Japan, as FERM-P No. 1827, and at American Type Culture Collection, Rockville, Md. as ATCC No. 20397.

The specific thiol-enzyme inhibitor, E–64 is obtainable by culturing *Aspergillus japonicus* TPR–64 and mutants thereof on the bran solid culture medium.

E–64 begins to appear in the extracts of the culture medium after about 2 days incubation at 30°C. and attains to its maximal amount after 3 to 4 days.

As a solvent for extraction of E–64 from the culture medium, water and an organic solvent such as methanol, pyridine, acetic acid and dimethylsulfoxide may be used. Especially, water and methanol are preferably used as an extracting solvent and afford good yield of the objective substance.

In the present invention, E–64 is effectively extracted from the culture medium with about 2.5 parts of water (W/V) or 5 parts of methanol (W/V) and can be obtained as crude powder by evaporation in vacuo.

Moreover, E–64 can be further purified and isolated by the efficient combination of the column chromatography of ion exchange resins, ion exchangers and adsorbents such as active carbon or cellulose powders and gel filtration on Sephadex G–10, G–15 and G–25.

For example, after the filtration of the concentrated extract of the culture medium through diatomaceous earth, the filtrate is adsorbed on an active carbon column and eluted out with acetone-water mixture (1:1, V/V). After discarding acetone in the elute under reduced pressure, the elute is charged on the column of weak anion resin or ion exchanger such as phosphocellulose. In this procedure, E–64 shows weak adsorption to them and so is eluted with water following to impurities like pigments. The active fractions are condensed under reduced pressure and the objective substance is crystallized as white needle crystals by addition of the excess amount of acetone under cooling.

On the other hand, a strong anion exchange resin such as Amberlite IR-120 may be often used as an adsorbent of the crude extract solution advantageously and effectively in simplifying the purification procedure. For example, the active fraction charged on Amberlite IR-120 is eluted out easily and in a good recovery with 1 N ammonia solution.

The inhibitive activity of E–64 is assayed by the undermentioned papain caseinolytic activity method. That is, a half milliliter of papain solution (50 μg/ml of water, Sigma, × 2 cry.) is preincubated at 40°C. for 15 minutes with a mixture of 0.25 ml. of 0.04 M cystain solution of pH 6.8 containing 0.02 M disodium ethylenediaminetetraacetate and 0.25 ml. of E–64 solution. To them, 5 ml of 1% casein solution dissolved in M/15 phosphate buffer of pH 6.8 and preincubated at 40°C is added and incubated at 40°C. for 10 minutes. After incubation, 5 ml of 0.44 M trichloroacetic acid solution is added to stop the reaction. The filtrate of the reaction mixture is read at 280 mμ. The inhibitive activity is calculated form the formula, (B − A) × 100/B; wherein A is the absorption of E–64 and B is that of water instead of E–64 solution. Fifty percent inhibitive ratio ($ID_{50}$) is defined as "one inhibitive unit" (1 IU).

The papain inhibitive activity of E–64 crystal is stable between pH 2 to pH 9 at 100°C. for 15 minutes, but it readily degrades below pH 2 or above pH 10 under the same condition.

The thin layer chromatography of the crystal of E–64 on silica gel H (Merck) developed with n-butanol-acetic acid-water (3:1:1), n-butanol-butyl acetate-acetic acid-water (4:2:1:1), n-propanol-ethyl acetate-acetic acid-water (70:20:2:8), n-propanol-water (7:3) and water, reveals a single spot detected by Sakaguchi reaction at Rf 0.49, 0.16, 0.13, 0.55 and 0.52, respectively.

In the paper electrophoresis in the pyridine-acetate buffer of pH 6.5 (pyridine-acetic acid-water, 10:0.4:90) carried out on Toyo filter paper No. 51A for 30 minutes under 500 volts, the same sample travels 6.3 cm toward cathode as a unitary spot which designates that the tested substance is neutral or slightly basic in its electric character.

The crystal of E–64 decomposes at about 233°C. not giving the definite melting point.

On the other hand, it is freely soluble in water, methanol, acetic acid, pyridine, dimethylsulfoxide, slightly soluble in ethanol and propanol, and insoluble in acetone, ethylacetate, chloroform, ethylether, benzene and petroleum ether.

It gives positive reaction with the following reagents: Sakaguchi, Greig-Leaback (peptide test), Fiegl (dicarbonic acid test) and thio sulfate (epoxide test), but negative reaction with the following reagents: Ehrlich, Tollens, Molish, anthron, Elson-Morgan, sodium nitroprusside, ninhydrin and Cu-Folin.

The ultra violet spectrum of the crystal of E–64 shows only the end absorption of water. Its infrared spectrum determined with tablets of KBr illustrated in FIG. 1 shows characteristic bands at 3280, 3120, 2960, 2870, 1645, 1610, 1555, 1470, 1445, 1390, 1305, 1285, 1255, 1235, 1205, 1175, 1155, 1138, 1125, 1095, 1078, 960, 897, 868, 770, 695 and 460 $cm^{-1}$.

The nuclear magnetic resonance spectrum at 60 MHz of E–64 in $D_2O$ containing 1 gutta of DCl shows the signals at 0.95, 1.55, 3.17, 3.65 and 3.78 p.p.m. which are measured from the signals of an internal standard of sodium-2,2-dimethyl-2-sila-pentan-5-sulfonate.

Elementary analysis of E–64 gives C; 48.94%, N; 19.18%, H; 7.38%, O; 24.50% and its specific optical rotation $[\alpha]_D^{25}$ is + 23.2° (C=1%, water).

The molecular weight of E–64 obtained by the vapor pressure osmometry method is 348.

Silica gel thin layer chromatography of the hydrolysate of E–64 decomposed in 6 N hydrochloric acid at 105°C. for 20 hours shows two ninhydrin-positive products and one acidic component. One ninhydrin positive product is determined as L-leucine by amino acid autoanalyser and optical rotation measurement. Another ninhydrin positive product is isolated by the cellulose column chromatography, and crystallized in the form of its hydrochlorate from the mixture of aqueous ethanol and acetone. This crystal is determined as agmatine (1-amino-4-guanidobutan) according to the usual determination procedure. On the other hand, said acidic component gives negative reaction with thio sulfate, whereas the enzymatic digest thereof by Pronase (trademark of Kaken Co.) at 30°C. for 48 hours gives position one, expectedly, suggesting that epoxide comprised in E-64 decomposes during HCl-hydrolysis. The acidic component obtained by enzymatic digest can be extracted with ethylether and crystallized by the addition of petroleum ether. It is confirmed to be D-trans-epoxysuccinic acid by usual determination procedure.

The minimum molecular weight is calculated as 344 from leucine content (32.8%), and 366 from agmatine content (35.8%). These two values are very close to 348 described above. Therefore, the molecular formula of E-64 is considered as $C_{15}H_{27}N_5O_5$(M.W.; 357).

From the above molecular weight and the above-identified constituents, the specific enzyme inhibitor of the present invention, E-64, seems to be a compound having L-leucine, agmatine and D-trans-epoxysuccinic acid in the ratio of 1:1:1 as its constituents.

E-64 has a strong anti-thiol-protease activity and their $ID_{50}$ calculated from the inhibitive activity assay previously described is 0.084 μg for 160.7 μg ficin (N.B. co., × 2 cry.), 0.11 μg for 500 μg bromelin (Wako, Co.), 0.025 μg for 500 μg bromelain (Midorijyuji Co.) and 0.104 μg for 80 μg papain (Sigma, × 2 cry.). Moreover, E-64 shows strong inhibition against swine liver cathepsin B which is thiol-protease, weak inhibition against cathepsin A, but no inhibition against cathepsin D. These anit-cathepsin activities are determined by the technique of H. Ikezawa et al. (J. of Antibiotics, 24 (7) 488, 1971).

E-64 has no inhibitive activity against proteolysis of casein by trypsin (Sigma), chymotrypsin (Sigma), pepsin (Sigma), acid protease of *Peacilomyces varioti* and Nagarse (trademark of Nagase Industry), esterolysis of benzoylarginin-ethyl ester by kallikrein (Bayer), fivrinolysis by human plasmin (KABI), production of fibrin by thrombin (N.B. Co.) and elastolysis by swine pancreous elastase (Miles-Serabac).

E-64 shows neither antibacterial nor antifungal activity at 100 μg/ml. Further E-64 has no toxicity in mice at a dose of 125 mg/kg administered intravenously.

From the above-mentioned physical, chemical and enzymatic characters, the present compound of this invention is found as a novel specific enzyme inhibitor and is named as E-64 after the new strain number TPR-64.

The following examples illustrate presently preferred exemplary embodiments of the invention, but are not intended as a limitation thereof.

EXAMPLE 1

Solid culture medium for *Aspergillus japonicus* TPR-64 ATCC No. 20397 is prepared with the following ingredients:

| Wheat bran | 5 kg |
| Rice hulls | 1.7 kg |
| Water | 2.5 kg |

After sterilizing 30 g of the medium at 125°C. for 15 minutes, a dip of E-64 producing strain, *Aspergillus japonicus* TPR-64 ATCC No. 20397 is inoculated on the above culture medium and then incubated at 30°C. for 3 days.

This incubation gives a seed of *Aspergillus japonicus* TPR-64, ATCC No. 20397.

Nextly, on 10 kg of the same culture medium sterilized similarly at 125°C. for 15 minutes and spred on a pan of wood, a dip of spores of the seed *Aspergillus japonicus* TPR-64 ATCC No. 20397 is inoculated and cultivated under a cheese cloth cover at 30°C. for 3 days according to koji method.

The koji culture medium is extracted twice with initially 50 liters and followed by 25 liters of methanol. The extracts are collected and concentrated under reduced pressure, and then filtered through diatomaceous earth.

The filtrate of 2.15 liters is adsorbed on an activated charcoal column (Wako Co.) of 4.5 by 50 cm. Following sufficient washing with water, the active substance adsorbed on active charcoal is eluted with 50% acetone-water solution. Following the first elute of about 800 ml not showing anti-papainactivity, most active substance elutes in the subsequent fractions of 1000 ml. The active fractions collected and concentrated to 200 ml under reduced pressure are poured onto a column of 4.5 by 120 cm containing Amberlite CG-50 type 1 ($H^+$) and eluted with water. There is no active substance in the initial elute of about 7000 ml and most of the active substance appears in the subsequent 2000 ml of the elute. Similarly, the active fractions are collected and concentrated to approximately 100 ml under reduced pressure. The concentrate is charged on a column of 3 by 55 cm containing 500 ml of phosphocellulose ($H^+$) which is previously washed with water sufficiently until it shows neutral pH value., and is followed by elution with distilled water. The active substance elutes in the fractions between 1 to 1.5 liters. Said fractions are collected, condensed to about 30 ml under reduced pressure and applied on a column of 3.5 by 120 cm containing 1 liter of Sephadex G-25 previously equilibrated with distilled water. By this gel filtration procedure, the active fraction from which contaminated pigments are completely separated is obtained. Thus refined colorless active fraction gives an almost unitary spot in paper electrophoresis under the previously described condition. The dropwise addition of about 500 ml of acetone to the filtrate concentrated to about 30 ml affords 286 mg of white needle-shaped crystals. 0.146 μg of crystal E-64 1 IU of anti-papain activity. The recovery of the active substance from methanol extract is 63% in the over-all procedure.

EXAMPLE 2

The elute from the active charcoal column is concentrated under reduced pressure by the same manner as described in Example 1. Ten ml of the concentrate which has an antipapain activity of 4870 IU/ml is charged on a column of 2.5 by 60 cm containing 190 ml of phosphocellulose ($H^+$) equilibrated with distilled water and is eluted with distilled water at a flow rate of 50 ml/hr. No activity appears in the initial 540 ml of the elute and most of the active substance elutes in the subsequent 210 ml approximately. The dropwise addition of acetone to the condensed active fraction under cooling in the same manner described in Example 1 affords 21.8 mg of slightly brownish needle crystal. 0.180 μg of this crystal gives 1 IU of anti-papain activity. According to this procedure, 63% of the active substance is obtained from the methanol extract.

What is claimed is:

1. A specific enzyme inhibitor, E-64, possessing an inhibitive activity against only thiol-enzymes, said specific enzyme inhibitor being a white needle-shaped crystal, being freely soluble in water, methanol, acetic acid, pyridine and dimethylsulfoxide, slightly soluble in ethanol and propanol, and insoluble in acetone, ethylacetate, chloroform, ethylether, benzene and petroleum ether; giving positive Sakaguchi, Greig & Leaback's peptide detection, Fiegl's dicarbonic acid detection and thio sulfate tests, giving negative Ehrlich, Molish, Tollens, anthrone, Elson-Morgan, nitroprusside, ninhydrin and Cu-Folin tests; having a degree of optical rotation $[\alpha]_D^{25} = 23.2°$ (C=1%, water); containing the elements of carbon, nitrogen, hydrogen and oxygen, having analytical value;

C, 48.94; N, 19.18; H, 7.38; O, 24.50 having a molecular weight of about 357 and corresponding to the empirical formula $C_{15}H_{27}N_5O_5$; consisting of L-leucine, agmatine and D-transepoxysuccinic acid in the ratio of 1:1:1, decomposing at about 233°C. not giving the definite melting point, showing only the end absorption of water on an ultra violet spectrum, showing the characteristic bands of an infrared spectrum determined with tablets of KBr at 3280, 3120, 2960, 2870, 1645, 1610, 1555, 1470, 1445, 1390, 1305, 1285, 1255, 1235, 1205, 1175, 1155, 1138, 1125, 1095, 1078, 960, 897, 868, 770, 695 and 460 cm$^{-1}$, showing the signals of nuclear magnetic resonance spectrum at 60 MHz in $D_2O$ containing 1 gutta of DCl at 0.95, 1.55, 3.16, 3.65 and 3.78 p.p.m. which are measured from the signals of an internal standard of sodium-2,2-dimethyl-2-silapentan-5-sulfonate, traveling 6.3 cm toward cathode as a unitary spot on a paper electrophoresis carried out on Toyo filter paper No. 51A in the pyridine-acetate buffer of pH 6.5 (pyridine-acetic acid-water, 10:0.4:90) for 30 minutes under 500 volts and revealing a single spot detected by Sakaguchi reaction at Rf 0.49, 0.16, 0.13, 0.55 and 0.52 in the thin layer chromatography on silica gel H(Merck) developed with n-butanol-acetic acid-water (3:1:1), n-butanol-butyl acetate-acetic acid-water (4:2:1:1), n-propanol-ethyl acetate-acetic acid-water (70:20:2:8), n-propanol-water (7:3) and water, respectively.

2. A process for production of E-64 which comprises cultivating the microorganism strain *Aspergillus japonicus* TPR-64 (ATCC No. 20397) on a solid culture medium containing wheat bran, rice hull and water until E-64 is produced in said medium, extracting so-produced E-64 from the cultivating medium with water or an organic solvent and separating E-64 from the extracting solution.

3. A process according to claim 2 wherein E-64 is separated from the extracted solution by the combination of the column chromatography of ion exchange resins, ion exchangers and adsorbents.

* * * * *